Jan. 20, 1942.                R. J. GARTNER                2,270,585
                    HYDRAULIC PRESSURE PULSATING MECHANISM
                            Filed April 18, 1938
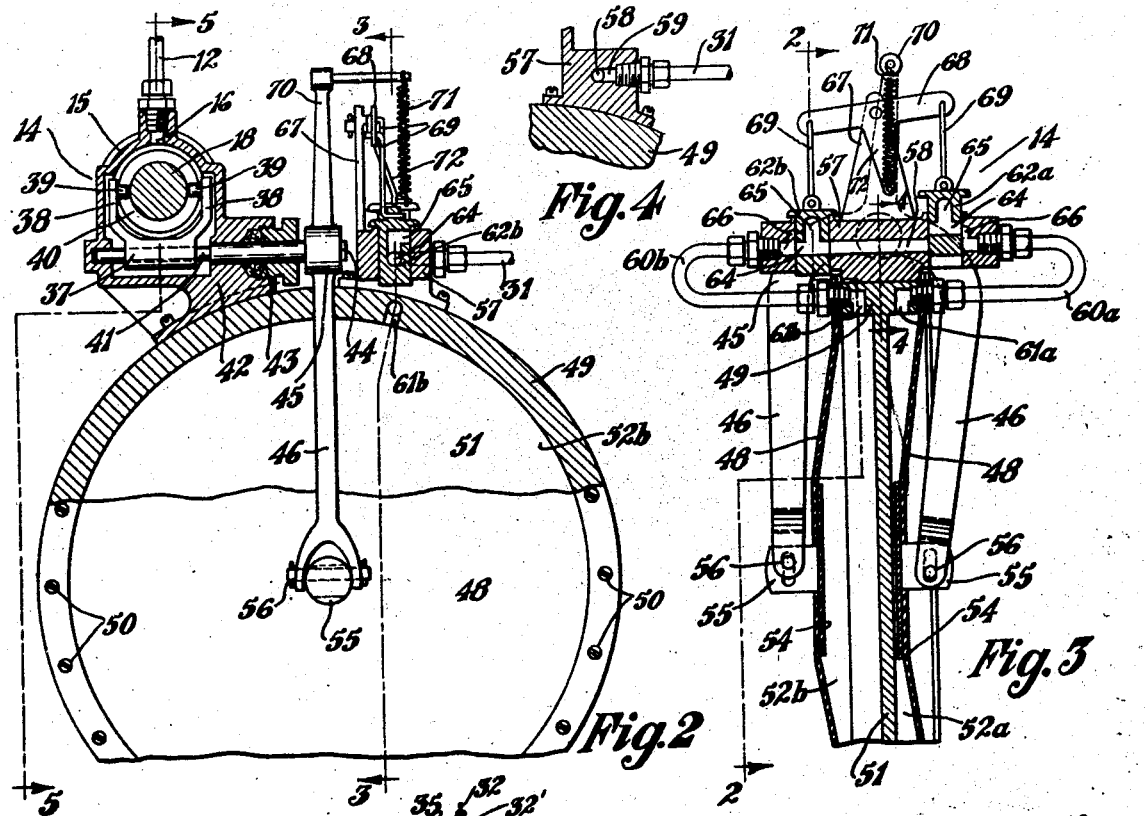
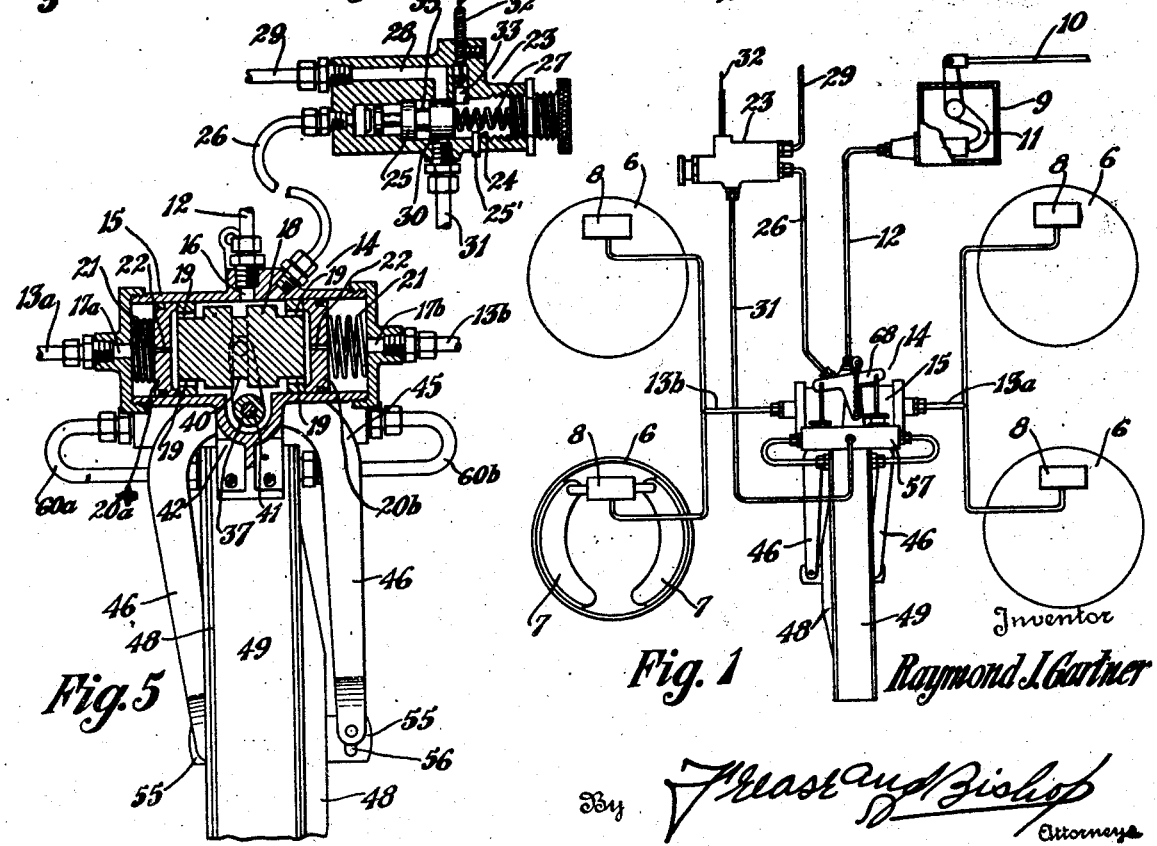
Inventor
Raymond J. Gartner
By Mason and Bishop
Attorneys Patented Jan. 20, 1942

2,270,585

UNITED STATES PATENT OFFICE 2,270,585

HYDRAULIC PRESSURE PULSATING MECHANISM

Raymond J. Gartner, Canton, Ohio, assignor to The General Tire & Rubber Company, Akron, Ohio, a corporation of Ohio Application April 18, 1938, Serial No. 202,687

31 Claims. (Cl. 188—152)

The invention relates generally to hydraulic pressure systems, and more particularly to novel means for pulsating the fluid in a hydraulic brake system for producing intermittent braking action.

The invention is particularly applicable to four-wheel hydraulic brake systems as used on modern automobiles, but it may be applied to other hydraulic pressure systems where a pulsating of the pressure fluid is desirable.

In the use of a conventional four-wheel hydraulic brake system on an automobile, when the operator depresses the brake pedal sufficiently to engage the brake shoes with the brake drums of all four wheels simultaneously, if the automobile is travelling over a slippery, wet or icy surface the wheels become locked and skidding results, even though the brake pedal is depressed a relatively small amount.

Moreover, where the brakes are applied during relatively long continuous intervals in order to effectively slow down the automobile in descending long grades, the linings of the brake shoes are apt to become greatly overheated, so as to seriously damage the same.

Experienced automobile drivers have learned that these dangers and disadvantages may be partially overcome by manually applying the brakes intermittently, that is, by "pumping" the brake pedal up and down with the foot so as to alternately engage and disengage the brake shoes, and thus decrease the likelihood of locking the wheels on slippery pavements or overheating the brake linings when descending long grades.

The success of this expedient, however, depends largely upon the skill and presence of mind of the driver, and is therefore either not done properly or not attempted by the majority of drivers of automobiles. At best, it is almost impossible to manually apply substantially the same amount of pressure with each down stroke of the pedal, or to "pump" the pedal fast enough to obtain the maximum effectiveness of the intermittent brake action without at least momentarily locking the wheels.

The present invention provides novel mechanism for pulsating the fluid in a hydraulic brake system so as to intermittently increase and decrease the pressure on the brake shoes by a small amount when the brake pedal is held in a partially depressed position, so as to rapidly engage and disengage the brake shoes from the brake drums.

It is a general object of the present invention to provide novel and improved means for pulsating the pressure in a hydraulic brake system to provide intermittent braking action.

Another object is to provide a novel pulsating mechanism for an automobile hydraulic brake system which will promote increased safety in driving.

Another object is to provide means actuated by initially depressing the brake pedal of an automobile for effecting intermittent braking action.

A further object is to provide novel means for pulsating the fluid in an automobile hydraulic brake system so as to intermittently brake the wheels thereof while substantially preventing the wheels from becoming locked.

Another object is to provide improved means for applying substantially uniform intermittent pressure to the brake shoes in an automobile hydraulic brake system.

A further object is to provide novel and improved mechanism for pulsating the pressure in a hydraulic brake system, which mechanism is adapted to be incorporated easily and inexpensively in a conventional hydraulic brake system.

These and other objects are attained by the parts, elements, mechanisms, combinations and arrangements comprising the present invention, which is defined in the appended claims, and a preferred embodiment of which is herein disclosed and described by way of example.

Referring to the drawing forming part hereof, I have shown the present invention embodied in a fluid pressure brake system for automobiles, by way of example.

Figure 1 is a diagrammatic view showing the invention as embodied in a four-wheel hydraulic brake system;

Fig. 2 is a sectional view, partly in elevation, of the improved pulsating mechanism, taken substantially on line 2—2, Fig. 3;

Fig. 3 is a sectional view thereof, taken substantially on line 3—3, Fig. 2, with the more distant parts removed;

Fig. 4 is a fragmentary sectional view, as on line 4—4, Fig. 3; and

Fig. 5 is a sectional view, partly in elevation as on line 5—5, Fig. 2, showing the pulsating mechanism and the control valve therefor.

Similar numerals refer to similar parts throughout the several views of the drawing.

Referring first to Fig. 1, the usual hydraulic brakes for the four wheels are indicated diagrammatically at 6, and each brake 6 includes shoes 7 arranged to be actuated by pistons in the wheel cylinders 8. When pressure is created in the master cylinder 9, as by a foot pedal (not shown) connected to link 10 which moves lever 11, the pressure is communicated through tube 12 and branch tubes 13a and 13b to all of the wheel cylinders 8 simultaneously, for actuating the brake shoes.

The structure thus far described is according to conventional design and per se forms no part of the present invention.

The novel pulsating means and the actuating mechanism therefor is indicated generally at 14. The pulsating means preferably includes a cylinder 15 having a fluid pressure inlet port 16 intermediate its ends communicating with tube 12, and having ports 17a and 17b at its ends communicating respectively with tubes 13a and 13b.

A main piston 18 is provided in cylinder 15, having an intermediate portion of materially less diameter than the inner diameter of the cylinder, and having ports 19 through its ends for transmitting fluid entering port 16 in opposite directions through the piston. The total cross sectional area of the ports 19 is substantially equal to that of port 16, so as to transmit all of the fluid entering through port 16.

At the ends of piston 18 are auxiliary pistons 20a and 20b normally held in abutment with the piston 18 by springs 21 acting against the end walls of the cylinder 15, and each auxiliary piston has a very small compensating port 22 therethrough for a purpose to be described.

The novel pulsating mechanism is selectively controlled, and in the normal operation of the brake system if the novel pulsating mechanism is not operating, pressure created in the master cylinder 9 causes fluid to enter through port 16 and pass through ports 19 forcing auxiliary pistons 20a and 20b outwardly against springs 21 to transmit pressure through tubes 13a and 13b and actuate the brakes, and the compensating ports 22 allow the springs to return the auxiliary pistons into abutting relation with the ends of piston 18. When the pressure is released at the master cylinder, the compensating ports 22 allow fluid to flow from the wheel cylinders back through tube 12 to the master cylinder.

Means for controlling the operation of the novel pulsating mechanism preferably includes a control valve indicated generally at 23. The valve 23 preferably has a cylindric bore 24 in which a piston 25 is slidably mounted, one end of the bore 24 being connected to a tube 26 communicating with the interior of cylinder 15, and the other end of the bore has a spring 27 therein abutting the piston 25 for yieldingly resisting movement of the piston. A port 28 is provided in the valve housing and communicates at its outer end with a tube 29 leading to the intake manifold of the automobile engine, and at its inner end with the bore 24. Opposite the port 28 the bore 24 communicates with a port 30 connected to a tube 31 which leads to the mechanism for actuating the pulsating piston 18.

Manual means for controlling the valve 23 may include a wire 32 in a flexible casing 32', of usual construction, which wire may be operated from the instrument panel or other convenient place, similar to the usual wire choke control. The wire 32 is connected to a stop member 33 which normally prevents movement of the piston 25 against the spring 27, and upon moving the stop member 33 out of the bore 24 by manipulation of wire 32, the piston 25 is free to be moved against spring 27 by fluid pressure in tube 26.

Thus when the stop member 33 is withdrawn from bore 24, any pressure created in the master cylinder and transmitted through tube 26 will force piston 25 to the right against stop pin 25' as viewed in the drawing, so that its reduced intermediate portion 35 registers with the ports 28 and 30 and provides communication between tubes 29 and 31 for operating the mechanism which actuates the pulsating piston 18, by vacuum from the intake manifold.

While the pulsating mechanism is shown and described as being actuated by vacuum means, it is understood that any other suitable means may be employed without departing from the scope of the invention as defined in the appended claims.

Means for reciprocating the piston 18 in cylinder 15 preferably includes a yoke 37 having arms 38 (Fig. 2) with inwardly projecting studs 39 at their upper ends, and said studs are slidably engaged in an annular slot 40 at the central portion of the piston 18. The yoke 37 is secured on a shaft 41 which is rotatably mounted in an irregular boss portion 42 on cylinder 15, and the shaft extends through said boss portion and through a suitable packing gland 43, the end 44 of the shaft projecting outwardly therefrom.

Means for oscillating the shaft 41 to reciprocate piston 18 preferably includes a fork 45 secured on the projecting shaft end 44. The downwardly extending arms 46 of the fork are connected with disks 48 of flexible material such as rubber, forming the sides of a diaphragm. Preferably the disks 48 are secured at their edges to an annular metal housing member 49, as by bolts 50, and a metal partition wall 51 extending from said housing member 49 divides the space between the disks 48 into two chambers 52a and 52b. Preferably, the boss portion 42 of cylinder 15 is mounted on said housing member 49, as shown in Figs. 2 and 5.

Supporting metal disks 54 are preferably provided inside the central portions of the flexible disks 48 and have projections 55 extending through said flexible disks, with which the arms 46 of the fork are connected by means of pin and slot connections indicated at 56.

Means for controlling the vacuum to the chambers 52a and 52b preferably includes a tubular body member 57 mounted on the annular housing member 49 and having a longitudinal bore 58 therethrough. Preferably the tube 31 from the control valve 23 communicates with said bore 58 through a port 59 as shown in Fig. 4. A U-shaped tube 60a is connected at one end with one end of the bore 58, and the tube 60a is connected at its other end with a port 61a in housing member 49 communicating with chamber 52a. Similarly a U-shaped tube 60b is connected at one end with the other end of bore 58 and with a port 61b in housing member 49 communicating with chamber 52b.

Transverse valve passages intersecting the bore 58 are provided through the body member, and valves 62a and 62b are slidably mounted in said passages. Each of the valves 62a and 62b has a horizontal port 64 therethrough adapted to register with the bore 58, and each valve has an upwardly extending L-shaped passage 65 for providing communication between the horizontal port 64 and the atmosphere when the valve is in raised position, that is, in the position of valve 62a in Fig. 3. A by-pass 66 is provided in each end of the body member 57 for providing communication between the bore 58 and the horizontal port 64 of the adjacent valve in raised position, as shown in Fig. 3.

Preferably, the body member 57 is provided with an upwardly projecting arm 67 on which is pivotally mounted a toggle arm 68 to the ends of which links 69 are connected, and the links are connected at their other ends to valves 62a and 62b respectively. The fork 45 has an upwardly extending arm 70, and a spring 71 is connected between the upper end of the fork arm 70 and the lower end of a depending arm 72 on the toggle, so that as the fork oscillates about the shaft 44 as a center to one side or the other, the spring 71 in passing over center will snap the toggle arm 68 to its extreme position with one of the valves 62a or 62b in the up position and the other in the down position.

In the operation of the improved pulsating mechanism, assuming that the stop member 33 has been manipulated to permit movement of piston 25 of the central valve 23, when an initial pressure is created at the master cylinder 9, the pressure transmitted through tube 26 acts on piston 25 to connect the intake manifold with the bore 58 of the body member 57, through tubes 29 and 31.

The initial pressure will of course be transmitted immediately to the brake shoes through tubes 13a and 13b, as previously described, and as long as the initial pressure is maintained, the vacuum connections to the diaphragm chambers will immediately and continuously oscillate the fork 45 and reciprocate the piston 18.

The manner in which the vacuum from the intake manifold oscillates the fork will now be described. Referring to Fig. 3, the chamber 52b is in communication with bore 58 through port 61b, tube 60b and port 64 in valve 62b. Hence the air is being exhausted from chamber 52b, and at the same time atmospheric air enters port 65 in valve 62a and passes through by-pass 66, tube 60a and port 61a into chamber 52a. As soon as sufficient air is exhausted from chamber 52b, the fork 45 will begin to oscillate in a counterclockwise direction, and when the spring 71 passes over center the toggle 68 will snap the valves to their opposite positions, that is, with valve 62a down and valve 62b up. In this position the oscillation of the fork is immediately reversed, so that a rapid oscillation of the fork and a consequent reciprocation of the piston 18 will continue as long as manual pressure in the system is maintained at the master cylinder, as by the operator keeping his foot on the brake pedal.

Referring to Fig. 5, when the piston 18 is reciprocated as aforesaid, movement of the piston to the right as viewed in Fig. 5 will force the auxiliary piston 20b to the right against its spring 21, and cause a corresponding increase or pulsation of pressure in branch tube 13b and a corresponding increase of pressure on the brake shoes actuated thereby.

When the piston 18 is reciprocated in the opposite direction an increase of pressure will be transmitted through the tube 13a to the other two brakes, and piston 20b will be permitted to follow piston 18 due to the pressure of its spring 21, which is sufficient to overcome the frictional loss of fluid flowing through tube 13b, causing a slight decrease of pressure in the tube 13b. Thus as the piston 18 is reciprocated the pressure on the brakes will be intermittently increased above initial pressure and then decreased slightly below initial pressure. The novel pulsating mechanism operates to pulsate the pressure in the hydraulic brake system regardless of increase or decrease of pressure in the system by manipulation of the brake pedal, and the pulsations are not transmitted to the brake pedal.

If the tube 13a is connected to the two front brakes and the tube 13b is connected to the two rear brakes, it will be seen that the pressure will be pulsated in the system so as to intermittently increase and decrease the pressure transmitted alternately to the front and rear brakes. Thus the pressure on the front brakes is increased to cause the front brake shoes to grip their brake drums and simultaneously the decrease of pressure at the rear brakes tends to release the rear brake shoes, and vice versa.

The present improved apparatus will function in such a manner that when the operator applies initial pressure to the brake pedal the novel pulsating mechanism will intermittently increase and decrease the pressure on the brake shoes so as to momentarily grip and then immediately tend to release the same. As a result, the brakes will be substantially prevented from becoming locked regardless of decreased traction due to slippery pavement, making for increased safety in driving.

Moreover, the use of the present invention in descending long grades with an automobile will greatly reduce overheating on the brake linings, due to the fact that the brake shoes will be intermittently engaged rather than continuously engaged, while maintaining an initial pressure on the brake pedal.

The principles of the present invention may be utilized in various ways, numerous modifications and alterations being contemplated, substitution of parts and changes in construction being resorted to as desired, it being understood that the embodiment shown in the drawing and described above is given merely for purposes of explanation and illustration without intending to limit the scope of the claims to the specific details disclosed.

I claim:

1. In a hydraulic fluid pressure system, piston means for pulsating the fluid therein, and means operable by initiating pressure in said system for reciprocating said piston means.

2. In a hydraulic fluid pressure system, means for initiating pressure in said system, means for pulsating the fluid therein, and means rendered operable by said pressure initiating means for actuating the pulsating means while the initial pressure is maintained in the system.

3. In a hydraulic fluid pressure system, means for initiating pressure in said system, piston means in the system for pulsating the fluid therein, and means for reciprocating said piston means while initial pressure in the system is maintained.

4. In a hydraulic fluid pressure system, means for manually initiating pressure therein, a reciprocable piston connected in said system for pulsating the fluid therein, and means rendered operable by said pressure initiating means for reciprocating said piston means while said initial pressure is maintained.

5. In a hydraulic fluid brake system, means for creating pressure in said system to actuate the brakes, and means connected in said system for pulsating the fluid therein to intermittently increase and decrease the pressure transmitted to the brakes when initial pressure caused by the pressure creating means is maintained in said system.

6. In a hydraulic fluid brake system, means for creating pressure in said system to actuate the brakes, means connected in said system for pulsating the fluid therein, and means for actuating said pulsating means to intermittently increase and decrease the pressure transmitted to the brakes when initial pressure in said system is maintained by said pressure creating means.

7. In a hydraulic fluid brake system, means for creating pressure in said system to actuate the brakes, reciprocable piston means connected in said system for pulsating the fluid therein to intermittently increase and decrease the pressure transmitted to the brakes when initial pressure in the system is maintained, and means for reciprocating said piston means.

8. In a hydraulic fluid brake system, means for initiating pressure in said system to actuate the brakes, and means connected in said system rendered operable by said pressure initiating means for pulsating the fluid in said system to intermittently increase and decrease the pressure transmitted to the brakes when initial pressure in the system is maintained.

9. In a hydraulic fluid brake system, means for initiating pressure in the system to actuate the brakes, reciprocable piston means connected in said system for pulsating the fluid in said system to intermittently increase and decrease the pressure transmitted to the brakes while initial pressure in the system is maintained, and means rendered operable by said pressure initiating for reciprocating said piston.

10. In a hydraulic fluid brake system, means for initiating pressure in the system to actuate a plurality of brakes simultaneously, and means connected in said system for pulsating the fluid therein to transmit increased pressure intermittently to alternate groups of said brakes while initial pressure in the system is maintained.

11. In a hydraulic fluid brake system, a pedal for initiating pressure in the system to actuate the brakes, pulsating means in the system for intermittently increasing and decreasing the pressure transmitted to the brakes, means rendered operable by pressure initiating movement of said pedal for operating said pulsating means.

12. In a hydraulic fluid brake system, means for initiating pressure in the system to actuate a plurality of brakes simultaneously, pulsating means in the system for intermittently increasing and decreasing the pressure therein, and means for transmitting said pulsations alternately to different groups of brakes while initial pressure in the system is maintained.

13. In a vehicle hydraulic brake mechanism having a conduit for carrying high pressure fluid from a pressure chamber to energize the brakes the combination of a pulsator interposed in the conduit, said pulsator including a chamber communicating with the conduit, and automatic means for alternately increasing and decreasing the size of the pulsator chamber to produce a series of pressure pulsations of relatively small magnitude in the conduit.

14. The method of retarding the velocity of a multiple-wheeled vehicle having pedal-actuated friction brakes on a number of wheels which comprises applying frictional brake loads to the wheels to resist the rotation thereof and mechanically causing rapidly recurrent pulsations in the amount of the loads in response to the load application, the pulsations for some of the wheels being out of phase with respect to the pulsations for other of the wheels.

15. The method of retarding the velocity of a wheeled vehicle which comprises applying a primary frictional load to the rotating wheel to resist the rotation thereof, and causing predetermined alternate increases and decreases in the amount of such load to establish a succession of loads alternately greater than and less than the primary load, the alternate increases and decreases being rapidly recurrent to produce load pulsations on the wheel.

16. The method of retarding the velocity of a vehicle having front and rear wheels and pedal-actuated friction brakes on the wheels which comprises applying frictional brake loads to the wheels to resist the rotation thereof and separately causing rapidly recurrent pulsations in the amount of the loads, the pulsations for the front wheel brakes being out of phase with respect to the pulsations for the rear wheel brakes.

17. The method of retarding the velocity of a wheeled vehicle which comprises applying a primary frictional load to the rotating wheel to resist the rotation thereof, increasing the load in response to the primary load application to establish a secondary load greater than the primary load while the wheel is rotating, and decreasing the secondary load while the wheel is rotating, the increasing and decreasing of the load being repeated in rapidly recurrent alternations.

18. The method of operating an hydraulic brake system for a wheeled vehicle having a pressure developing chamber and a liquid pressure transmitting medium in the chamber and extending to the wheel brakes, which comprises applying primary pressure to the medium in the chamber to impart a braking load to the wheel brakes, increasing the pressure on the medium by a predetermined amount and then decreasing the pressure on the medium by a predetermined amount below the primary pressure, said pressure increasing and decreasing being repeated in rapidly recurrent alternations while the wheels are rotating to create pressure pulsations in the medium of the system.

19. In a hydraulic brake system having wheel brakes and fluid conduits connected to the latter, a pulsator for creating a series of rapidly recurrent pressure impulses in the fluid conduits comprising means defining a vacuum chamber including a flexible diaphragm wall, liquid pump means, actuating means for the pump having connection with the diaphragm, means for alternately connecting the chamber to an evacuating source and to the atmosphere to actuate the diaphragm, and means connecting the fluid pump to the fluid conduits for the brakes of the system for pulsating the latter during actuation of the diaphragm.

20. In a hydraulic brake system having wheel brakes and fluid conduits connected to the latter, a pulsator for creating a series of rapidly recurrent pressure impulses in the fluid conduits comprising a support member recessed on opposite sides, flexible diaphragms disposed across the recesses to provide vacuum chambers, an actuating member pivoted on the support member and connected to the diaphragms, means for alternately connecting the chambers to an evacuating source to thereby cause the diaphragms to reciprocate and operate the actuating member, and a fluid pump operatively connected to the actuating member to be actuated thereby.

21. In a brake system having fluid actuable brakes, a cylinder, a piston in the cylinder to provide therein a fluid receiving chamber and a fluid pulsating chamber, means connecting at least one of the brakes to the pulsating chamber, a fluid pressure source and means connecting the same to the receiving chamber, means for actuating the piston to create fluid pressure pulsations in the pulsating chamber, and means connecting the chambers for the flow of fluid therebetween.

22. In a vehicle hydraulic brake mechanism having a conduit for carrying high pressure fluid from a pressure chamber to energize the brakes, the combination of a pulsator interposed in the conduit, said pulsator including a piston disposed in the path of fluid through the pulsator, and means for reciprocating the piston in response to an increase in fluid pressure in the conduit to create a succession of rapidly recurrent pressure pulsations in the conduit.

23. In a vehicle hydraulic brake mechanism having a conduit for carrying high pressure fluid from a pressure chamber to energize the brakes, the combination of a pulsator interposed in the conduit, said pulsator including a piston disposed in the path of fluid through the pulsator, means providing a passage for the flow of fluid in the pulsator from one side of the piston to the other, and means for actuating the piston sufficiently rapidly to create a series of pressure pulsations in the conduit notwithstanding the flow of fluid through said passage during said actuation.

24. The method of controlling the retarding of a wheeled vehicle having a brake actuable by the manual application of variable pressure thereto by the operator which comprises manually applying pressure to the brake and concurrently creating separately energized pulsations in the manually applied pressure.

25. The method of operating vehicle brakes which comprises manually applying pressure thereto and concurrently creating mechanically energized pulsations in the manually applied pressure.

26. The method of operating vehicle brakes which comprises manually applying primary pressure to a pressure transmitting medium and separately creating mechanically energized concurrent secondary pressure pulsations in the medium to effect rapid fluctuations in the manually applied primary pressure.

27. The method of controlling the retarding of a wheeled vehicle having a brake actuable by the manual application of variable pressure thereto, which comprises manually applying pressure to the brake and initiating the automatic creation of pressure pulsations on the brake in response to the pressure manually applied.

28. The method of operating a hydraulic brake system having fluid pressure generating means under manual control and fluid conducting means extending between said means and the brake, which comprises manually applying pressure on fluid in said pressure generating means and separately and mechanically pulsating the fluid pressure in the conducting means.

29. The method of operating a hydraulic brake system which comprises applying a steady pressure on the brake fluid and concurrently impressing rapid pressure pulsations of low magnitude on the fluid whereby the applied pressure is rapidly fluctuated to provide recurrent variations in the braking force.

30. The method of operating a hydraulic brake system which comprises increasing the pressure on the brake fluid and concurrently impressing pressure pulsations on the fluid for rapidly fluctuating the braking force.

31. The method of operating a hydraulic brake system which comprises increasing the pressure on the brake fluid and initiating separately applied pressure pulsations in the fluid in response to said increasing of the pressure to provide rapid fluctations in the braking force.

RAYMOND J. GARTNER.

CERTIFICATE OF CORRECTION.

Patent No. 2,270,585. January 20, 1942.

RAYMOND J. GARTNER.

It is hereby certified that error appears in the printed specification of the above numbered patent requiring correction as follows: Page 4, first column, line 35, claim 9, after "initiating" insert --means--; and that the said Letters Patent should be read with this correction therein that the same may conform to the record of the case in the Patent Office.

Signed and sealed this 21st day of April, A. D. 1942.

Henry Van Arsdale,
Acting Commissioner of Patents.

(Seal)